US008727107B2

(12) United States Patent
Formicola et al.

(10) Patent No.: US 8,727,107 B2

(45) Date of Patent: May 20, 2014

(54) SELF-CENTERING BELT SUPPORT FEATURE

(75) Inventors: Anthony J. Formicola, Marion, NY (US); Thomas G. Rath, Hamlin, NY (US); Kevin H. Taft, Williamson, NY (US); Sandra L. Schmitt, Williamson, NY (US); Timothy J. Ellis, Caledonia, NY (US)

(73) Assignee: Xerox Corporation, Norwalk, CT (US)

(*) Notice: Subject to any disclaimer, the term of this patent is extended or adjusted under 35 U.S.C. 154(b) by 405 days.

(21) Appl. No.: 13/212,340

(22) Filed: Aug. 18, 2011

(65) Prior Publication Data

US 2013/0042804 A1 Feb. 21, 2013

(51) Int. Cl.
*B65G 23/44* (2006.01)

(52) U.S. Cl.
USPC ..................................... 198/813; 198/810.04

(58) Field of Classification Search
USPC ......... 198/813, 814, 810.03, 810.04; 399/165
See application file for complete search history.

(56) References Cited

U.S. PATENT DOCUMENTS

| | | | | |
|---|---|---|---|---|
| 1,634,187 | A * | 6/1927 | Hartvikson | 198/814 |
| 2,797,075 | A * | 6/1957 | Wilbur | 198/810.04 |
| 3,414,115 | A * | 12/1968 | Gates et al. | 198/814 |
| 4,585,118 | A | 4/1986 | Plaut | |
| 4,627,702 | A | 12/1986 | Anderson | |
| 5,383,006 | A * | 1/1995 | Castelli | 399/165 |
| 5,872,832 | A | 2/1999 | Bishel et al. | |
| 6,032,004 | A | 2/2000 | Mirabella, Jr. et al. | |
| 6,408,753 | B1 | 6/2002 | Finn et al. | |
| 7,136,611 | B1 * | 11/2006 | Murase | 399/165 |
| 2007/0107224 | A1 | 5/2007 | Reynolds | |
| 2008/0296131 | A1 * | 12/2008 | Tippery et al. | 198/813 |
| 2009/0078543 | A1 * | 3/2009 | Shoji | 198/813 |

* cited by examiner

*Primary Examiner* — James R Bidwell
(74) *Attorney, Agent, or Firm* — Gibb & Riley, LLC

(57) ABSTRACT

An apparatus comprises a frame having a first frame section connected to a second frame section. The frame also has at least one physical connection that allows the first frame section to move relative to the second frame section. A first roller is connected to the first frame section. The first roller has a crowned outer surface surrounding an axle. Also, first connectors connect the first roller to the first frame section. The first connectors allow the first roller to rotate around the axle and allow the first roller to move in a direction parallel to the axle. A second roller is also connected to the second frame section. At least one biasing member is connected to the first frame section and the second frame section. The biasing member applies a bias to cause the first frame section to move away from the second frame section. A belt substrate contacts the first roller and the second roller. A latch is connected to the first frame section and the second frame section. The latch allows the frame to collapse by moving the first frame section toward the second frame section and disconnecting the biasing member.

20 Claims, 3 Drawing Sheets

SELF-CENTERING BELT SUPPORT FEATURE

BACKGROUND

Embodiments herein generally relate to surfaces upon which coatings are formed and more particularly to an improved mandrel structure that includes a roller having a crowned outer shape (that is adjustable side-to-side) that supports a belt upon which coatings are formed.

A current method of applying liquid coatings to belts utilizes a rotating dual roller belt coating mandrel. The coatings are applied using a well-known flowcoating method. During such flowcoating, the belt that is to be coated should remain in the same lateral position throughout the coating process and should not "walk" off of the mandrel during the rotational oven cure that follows. Belt-to-belt dimensional variations and the tolerances of the mandrels make this a challenge.

SUMMARY

An exemplary apparatus comprises a frame having an arbitrarily named "first" frame section connected to a "second" frame section by at least one physical connection that allows the first frame section to move relative to the second frame section. In one example, the physical connection comprises an X-shaped scissor frame structure.

A "first" roller is connected to the first frame section. Note that the rollers are sometimes referred to herein as "mandrels." The first roller has a crowned outer surface surrounding an axle. The crowned outer surface of the first roller includes a center outer surface portion that has a larger diameter than the distal end outer surface portions. The center outer surface portion of the crowned outer surface is centered between the distal end outer surface portions of the crowned outer surface and is tapered between the center outer surface portion and the distal end outer surface portions. In some embodiments, the center outer surface portion can have a diameter at least 5%, 10%, 20%, 50%, etc., larger than the diameter of the distal end outer surface portions.

Also, one or more special laterally movable "first" connectors connect the first roller to the first frame section. The first connectors allow the first roller to rotate around the axle and allow the first roller to move in a direction parallel to the axle of the first roller. The first connectors can include "first" biasing members (e.g., one or more springs, actuators, pistons, etc.) that bias the first roller along the axle toward a centered position within the first frame section.

A "second" roller is also connected to the second frame section. The second roller can comprise, for example, a drive roller; and the first roller can comprise an idler roller. The outer surface of the second roller can be flat or crowned and, if crowned, the shape of the crown of the second roller can be the same or different than the shape of the crown of the first roller. Further, the second roller can be connected to the second frame section using a fixed connection that does not allow the second roller to move in a direction parallel to the second axle, or the second roller can be connected to the second frame section using such special laterally movable connectors.

At least one "second" biasing member is connected to the first frame section and the second frame section. The second biasing member applies a bias (a constant, steady force) to cause the first frame section to move away from the second frame section.

A continuous-loop belt substrate can contact and be positioned over the first roller and the second roller and various items can be formed on the belt substrate, depending upon the surface composition of the belt (e.g., a polyimide belt having a silicon release outer layer, etc.).

Also, a latch is connected to the first frame section and the second frame section. The latch allows the frame to collapse by moving the first frame section toward the second frame section and disconnecting the biasing member. The biasing member comprises an integral part of the latch.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, during flowcoating, the belt that is to be coated should remain in the same lateral position throughout the coating process and should not "walk" off of the mandrel during the rotational oven cure. It takes some time to center and stabilize each belt that is loaded on the rollers. Once adjusted the belt "walk" is minimal and while not negatively effecting the relatively short duration of the coating cycle is a cause for concern during the 20 minute rotational oven cure of the material coated thereon. One solution to minimize belt walk utilizes combinations of sensors and stepper motors to set and control the belt tracking; however, such a system is much more complex and costly than the structures described herein.

The structures described herein allow a fuser belt to self-center on the coating mandrel by using a crowned idle roller which is mounted on a center mounted spherical bearing. The spherical bearing allows the idle roller to float about its attachment to the through shaft in relation to its centerline. This movement allows the idle roller to conform as the belt seeks and maintains equilibrium. This also reduces the amount of belt tension required to track the belt that reduces coating defect related to waviness issues. The various rollers mentioned herein can have different diameters. The structures described have a smaller footprint for better space utilization and have parts that are easily replaceable, which reduces costs compared to a solid mandrel design.

Figure 1:
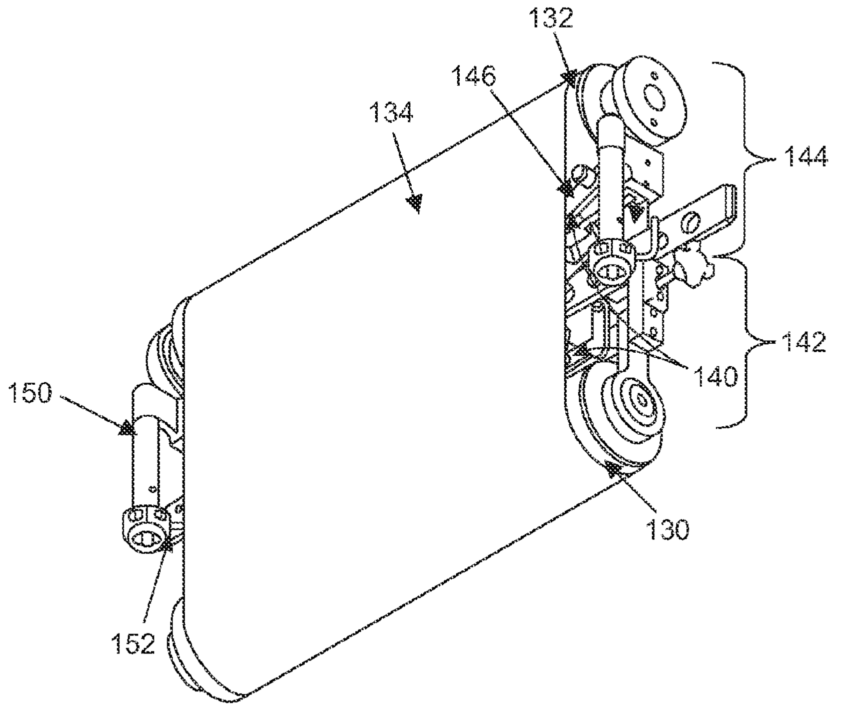
FIG. 1 is a perspective-view schematic diagram of a device according to embodiments herein.
Figure 2:
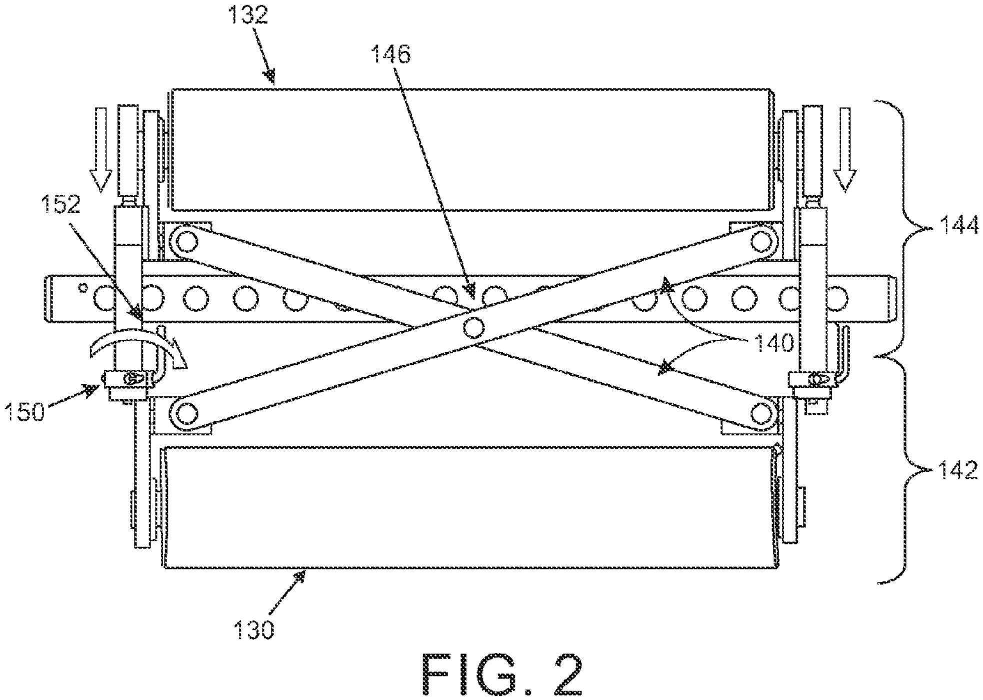
FIG. 2 is a perspective-view schematic diagram of a device according to embodiments herein.
Figure 3:
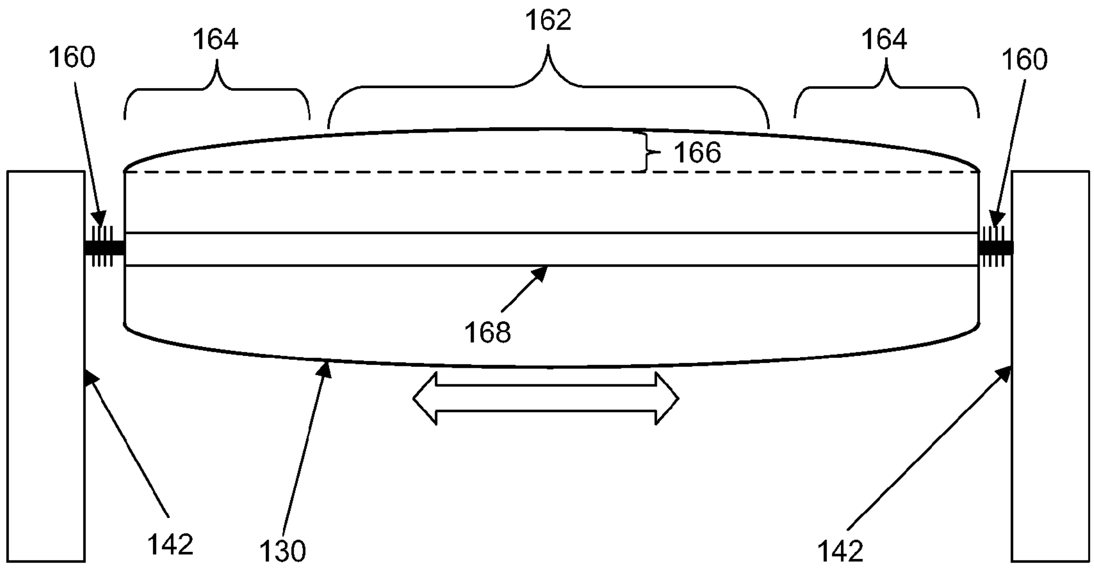
FIG. 3 is a side-view schematic diagram of a device according to embodiments herein.

An exemplary apparatus shown in FIGS. 1-3 comprises a frame 140 having an arbitrarily named "first" frame section 142 connected to a "second" frame section 144 by at least one physical connection that allows the first frame section 142 to move relative to the second frame section 144. In one example, the physical connection comprises an X-shaped scissor frame structure 146.

The belt coating mandrel includes a drive roller and an idle roller which are mounted parallel to each other on the spring tensioned mechanism 140. The mechanism 140 allows the rollers to be moved closer together for belt mounting. Once the belt 134 is slid over the mandrel, the rollers 130, 132 are released so that the belt 134 is tensioned between them.

Thus, a "first" roller 130 is connected to the first frame section 142. As shown in FIG. 3, the first roller 130 has a crowned outer surface surrounding an axle 168 about which the first roller 130 rotates. The crowned outer surface of the first roller 130 includes a center outer surface portion 162 that has a larger diameter (indicated by item 166) than the distal end outer surface portions 164. In some embodiments, the center outer surface portion 162 can have a diameter at least 5%, 10%, 20%, 50%, etc., larger than the diameter of the distal end outer surface portions (as shown by item 166). The center outer surface portion 162 of the crowned outer surface is centered between the distal end outer surface portions 164 of the crowned outer surface and is tapered between the center outer surface portion 162 and the distal end outer surface portions 164.

Also as shown in FIG. 3, one or more special laterally movable "first" connectors 160 connect the first roller 130 to the first frame section 142. In one example, the connectors 160 can comprise a spherical bearing. The first connectors 160 allow the first roller 130 to rotate around the axle 168 and allow the first roller 130 to move in a direction parallel to the axle 168 of the first roller 130 (as indicated by the double-headed arrow in FIG. 3). The first connectors 160 can include "first" biasing members (e.g., one or more springs, actuators, pistons, etc.) that bias the first roller 130 along the axle 168 toward a centered position within the first frame section 142.

The crown of the first roller 130 exhibits a strong influence on the belt to keep it centered. This centering influence has limitations however. Noises that include diameter variations from one end of the belt to the other as well as the squareness of the mandrel rollers to each other can diminish the centering effect of the crown. By allowing the crowned idle roller to conform to the belt the effect of these noises can be practically eliminated.

Referring back to FIG. 1, a "second" roller 132 is also connected to the second frame section 144. The second roller 132 can comprise, for example, a drive roller; and the first roller 130 can comprise an idler roller. A continuous-loop belt substrate 134 (shown only in FIG. 1 to avoid clutter) can contact and be positioned over the first roller 130 and the second roller 132 and various items can be formed on the belt substrate, depending upon the surface composition of the belt (e.g., a polyimide belt having a silicon release outer layer, etc.). Further, the silicone layer can be sanded in order to create a uniform coating surface and to increase adhesion.

The outer surface of the second roller 132 can be flat or crowned (similar to that shown in FIG. 3) and, if crowned, the shape of the crown of the second roller 132 can be the same or different than the shape of the crown of the first roller 130. Further, the second roller 132 can be connected to the second frame section 144 using a fixed connection that does not allow the second roller 132 to move in a direction parallel to the second axle 168, or the second roller 132 can be connected to the second frame section 144 using such special laterally movable connectors 160.

At least one "second" biasing member 152 is connected to the first frame section 142 and the second frame section 144. The second biasing member 152 applies a bias (a constant, steady force) to cause the first frame section 142 to move away from the second frame section 144.

Also, a latch 150 is connected to the first frame section 142 and the second frame section 144. As shown in FIG. 2, when the latch 150 handle is moved, this allows the frame to collapse by moving the first frame section 142 toward the second frame section 144 (as shown by the arrows in FIG. 2). This can be accomplished, for example by the latch 150 disconnecting the second biasing member 152, allowing the first roller 130 to move toward the second roller 132. The second biasing member 152 can comprise an integral part of the latch 150.

In addition, while a single latch 150 and biasing member 152 are illustrated in the drawings, those ordinarily skilled in the art would understand that the latch/biasing member could be located on both sides of the frame 140. Alternatively, the frame 140 could include multiple biasing members (located at various points on the frame 140) that are all operated by a single latch that could be centrally located (or located on one side of the structure). Further, while item 152 is described as a biasing member, those ordinarily skilled in the art would understand that it could be any form of adjustment device, such as an adjustment screw that adjusts the distance between the first and second rollers 130, 132 by turning a handle 150.

Such a belt 134 needs to be taut in order to properly allow the application of a uniform coating on the belt 134. A solid mandrel structure holding the first and second rollers 130, 132 would not accommodate a taut belt, and stretching the belt over the rollers can cause belt tearing. However, the structure described herein allows a belt with a large tolerance in diameter to be tensioned in an elliptical shape offset over the first and second rollers 130, 132. In addition the latch 150 allows the frame 140 to be collapsible.

This collapsible feature facilitates loading and unloading of the belts onto the rollers and provides the ability to handle additional sizes of belts. This reduces handling damage to belts, speeds the load/unload process, and adds production flexibility. There are also benefits to the coating quality related to increased latitude of application tooling placement. Thus, the embodiments herein can handle manufacturing variations in belt diameter, adapt to various size belts, reduce overall cycle time, reduce rejects related to handling damage, improve coating quality, etc.

Further, the adjustable frame 140 allows the belt to be uniformly tensioned and centered within the rollers preventing it from sliding off the rollers. For example, this structure can be used in a flowcoating process by placing one of the two rollers in a coating machine, and offsetting the belt at an angle to allow coating uniformity. By using a taunt belt and smaller rollers, the coating quality is increased because the distance between the nozzle and the coating blade on smaller diameter rolls is reduced.

Figure 4:
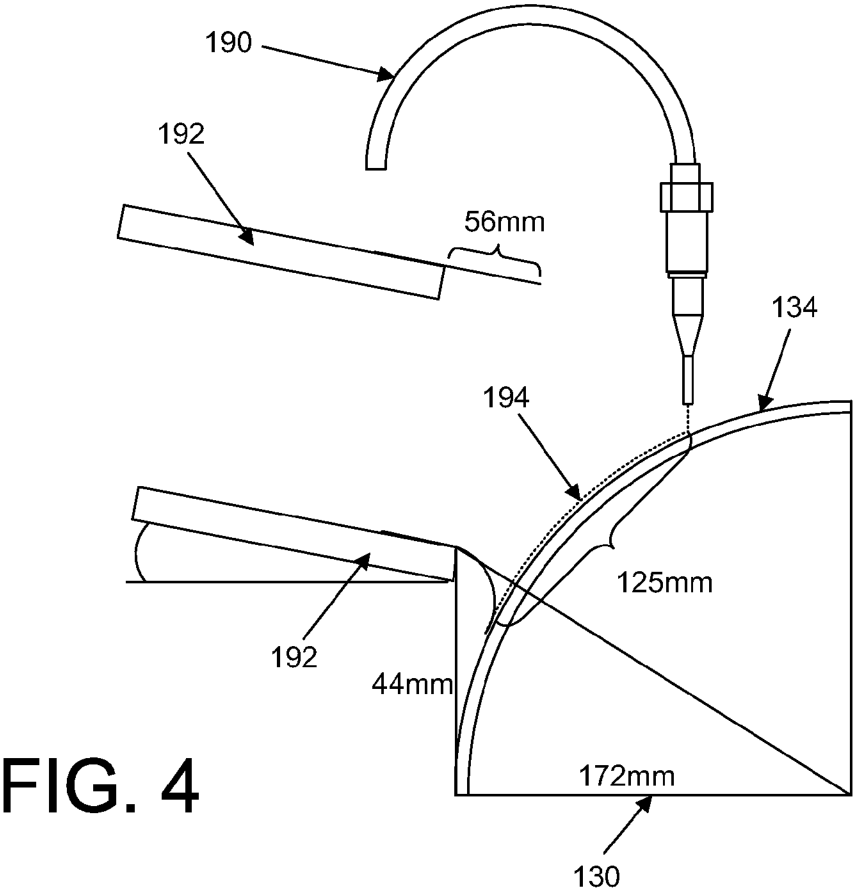
FIG. 4 is a side-view schematic diagram of a device according to embodiments herein.
Figure 5:
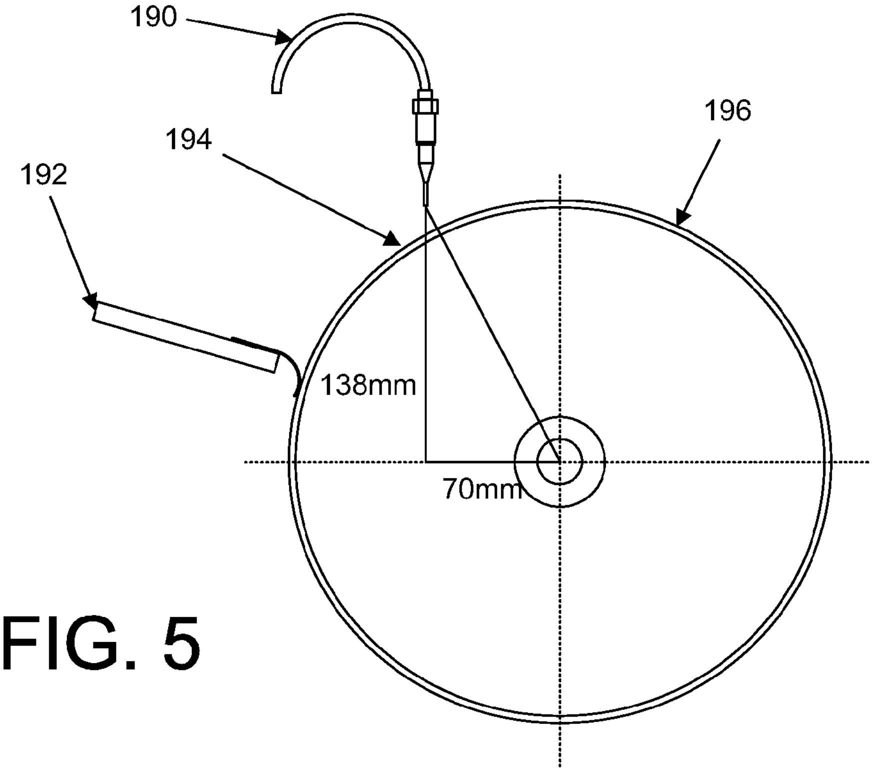
FIG. 5 is a side-view schematic diagram of a device according to embodiments herein.

For example, as shown in FIG. 5, for a coating 194 applied on a 12" roller 196 without a belt, the distance between the nozzle 190 and blade 192 is 125 mm. To the contrary, as shown in FIG. 4, using a belt 134 around a smaller 4" diameter size roller 130 places the nozzle 190 closer to the blade 192 (at approximately less than ⅓ of the distance (e.g., 44 mm)). As the distance between the nozzle 190 and blade 192 decreases, the ability to control how the coating material 194 lays on the surface of the belt 134 increases, allowing for more even (and more uniform) leveling of the coating 194 due to static electricity, flow geometry, and freshness of the coating bead being spread by the blade 192. Thus, even minor changes in the roller diameter and the size of the frame between the rollers can provide substantial benefits.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. An apparatus comprising:

a frame comprising a first frame section connected to a second frame section by at least one physical connection, said physical connection allowing said first frame section to move relative to said second frame section;

a first roller connected to said first frame section, said first roller comprising a crowned outer surface surrounding an axle, said crowned outer surface including a center outer surface portion having a larger diameter than distal end outer surface portions, said center outer surface portion being positioned between said distal end outer surface portions;

a second roller connected to said second frame section;

at least one biasing member connected to said first frame section and said second frame section, said biasing member applying a bias to cause said first frame section to move away from said second frame section; and a belt substrate contacting said first roller and said second roller.

2. The apparatus according to claim 1, said crowned outer surface being tapered between said center outer surface portion and said distal end outer surface portions.

3. The apparatus according to claim 1, said center outer surface portion having a diameter at least 5% larger than a diameter of said distal end outer surface portions.

4. The apparatus according to claim 1, said belt comprising a polyimide belt having a silicon release outer layer.

5. The apparatus according to claim 1, said second roller comprising a drive roller and said first roller comprising an idler roller.

6. An apparatus comprising:

a frame comprising a first frame section connected to a second frame section by at least one physical connection, said physical connection allowing said first frame section to move relative to said second frame section;

a first roller connected to said first frame section, said first roller comprising a crowned outer surface surrounding an axle, said crowned outer surface including a center outer surface portion having a larger diameter than distal end outer surface portions, said center outer surface portion being positioned between said distal end outer surface portions;

first connectors connecting said first roller to said first frame section, said first connectors allowing said first roller to rotate around said axle and allowing said first roller to move in a direction parallel to said axle;

a second roller connected to said second frame section;

at least one biasing member connected to said first frame section and said second frame section, said biasing member applying a bias to cause said first frame section to move away from said second frame section; and a belt substrate contacting said first roller and said second roller.

7. The apparatus according to claim 6, said crowned outer surface being tapered between said center outer surface portion and said distal end outer surface portions.

8. The apparatus according to claim 6, said first connectors comprising first biasing members that bias said first roller along said axle toward a centered position within said first frame section.

9. The apparatus according to claim 6, further comprising second connectors connecting said second roller to said second frame section, said second connectors allowing said second roller to rotate around a second axle of said second roller and not allowing said second roller to move in a direction parallel to said second axle.

10. The apparatus according to claim 6, said second roller comprising a drive roller and said first roller comprising an idler roller.

11. An apparatus comprising:

a frame comprising a first frame section connected to a second frame section by at least one physical connection, said physical connection allowing said first frame section to move relative to said second frame section;

a first roller connected to said first frame section;

a second roller connected to said second frame section;

at least one biasing member connected to said first frame section and said second frame section, said biasing member applying a bias to cause said first frame section to move away from said second frame section;

a belt substrate contacting said first roller and said second roller; and a latch connected to said first frame section and said second frame section, said latch allowing said frame to collapse by moving said first frame section toward said second frame section and disconnecting said biasing member.

12. The apparatus according to claim 11, said biasing member comprising an integral part of said latch.

13. The apparatus according to claim 11, said physical connection comprising an X-shaped scissor frame structure.

14. The apparatus according to claim 11, said belt comprising a polyimide belt having a silicon release outer layer.

15. The apparatus according to claim 11, said second roller comprising a drive roller and said first roller comprising an idler roller.

16. An apparatus comprising:

a frame comprising a first frame section connected to a second frame section by at least one physical connection, said physical connection allowing said first frame section to move relative to said second frame section;

a first roller connected to said first frame section, said first roller comprising a crowned outer surface surrounding an axle, said crowned outer surface including a center outer surface portion having a larger diameter than distal end outer surface portions, said center outer surface portion being positioned between said distal end outer surface portions;

first connectors connecting said first roller to said first frame section, said first connectors allowing said first roller to rotate around said axle and allowing said first roller to move in a direction parallel to said axle;

a second roller connected to said second frame section;

at least one biasing member connected to said first frame section and said second frame section, said biasing member applying a bias to cause said first frame section to move away from said second frame section;

a belt substrate contacting said first roller and said second roller; and a latch connected to said first frame section and said second frame section, said latch allowing said frame to collapse by moving said first frame section toward said second frame section and disconnecting said biasing member.

17. The apparatus according to claim 16, said crowned outer surface being tapered between said center outer surface portion and said distal end outer surface portions.

18. The apparatus according to claim 16, said first connectors comprising first biasing members that bias said first roller along said axle toward a centered position within said first frame section.

19. The apparatus according to claim 16, further comprising second connectors connecting said second roller to said second frame section, said second connectors allowing said second roller to rotate around a second axle of said second roller and not allowing said second roller to move in a direction parallel to said second axle.

20. The apparatus according to claim 16, said second roller comprising a drive roller and said first roller comprising an idler roller.

* * * * *